United States Patent
Kim et al.

(10) Patent No.: US 9,960,823 B2
(45) Date of Patent: May 1, 2018

(54) METHOD AND APPARATUS FOR SCHEDULING BEAM IN MOBILE COMMUNICATION SYSTEM OF ULTRAHIGH FREQUENCY WAVE BAND

(71) Applicant: Electronics and Telecommunications Research Institute, Daejeon (KR)

(72) Inventors: Il Gyu Kim, Chungcheongbuk-do (KR); Jun Hwan Lee, Seoul (KR); Hee Sang Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 140 days.

(21) Appl. No.: 14/970,021

(22) Filed: Dec. 15, 2015

(65) Prior Publication Data

US 2016/0174244 A1  Jun. 16, 2016

(30) Foreign Application Priority Data

Dec. 16, 2014  (KR) .................. 10-2014-0181850

(51) Int. Cl.
| H04H 20/67 | (2008.01) |
| H04B 7/0404 | (2017.01) |
| H04W 72/12 | (2009.01) |
| H04B 7/06 | (2006.01) |
| H04B 7/08 | (2006.01) |
| H04W 16/28 | (2009.01) |

(52) U.S. Cl.
CPC .......... *H04B 7/0404* (2013.01); *H04B 7/063* (2013.01); *H04B 7/0695* (2013.01); *H04B 7/088* (2013.01); *H04W 72/1284* (2013.01); *H04W 16/28* (2013.01)

(58) Field of Classification Search
CPC ...... H04B 7/0404; H04B 7/088; H04B 7/063; H04B 7/0695; H04W 72/1284; H04W 16/28

See application file for complete search history.

(56) References Cited

U.S. PATENT DOCUMENTS

| 7,920,646 | B2 | 4/2011 | Yeh et al. | |
| 2004/0179544 | A1* | 9/2004 | Wilson | H01Q 1/246 370/442 |
| 2011/0151912 | A1* | 6/2011 | Taira | H04B 7/024 455/509 |
| 2014/0004898 | A1* | 1/2014 | Yu | H04W 72/0413 455/510 |
| 2014/0073337 | A1 | 3/2014 | Etri | |
| 2015/0087295 | A1* | 3/2015 | Yang | H04W 52/242 455/422.1 |

(Continued)

FOREIGN PATENT DOCUMENTS

KR  100749448 B1  8/2007

*Primary Examiner* — Robert Wilson
(74) *Attorney, Agent, or Firm* — William Park & Associates Ltd.

(57) ABSTRACT

A method and apparatus for scheduling a beam in a mobile communication system are provided. A terminal receives signals through a plurality of switching beam directions, and receives a plurality of beams that are transmitted while performing beam switching in a transmission time interval (TTI) unit by a base station. The terminal selects a signal having largest intensity among received signals, and transmits an uplink scheduling request signal in a beam direction corresponding to the selected signal.

15 Claims, 7 Drawing Sheets

(56) References Cited

U.S. PATENT DOCUMENTS

| | | | |
|---|---|---|---|
| 2016/0029404 A1* | 1/2016 | Aryafar | H04W 72/1231 370/277 |
| 2016/0056875 A1* | 2/2016 | Kang | H04B 7/0456 370/329 |
| 2016/0174244 A1* | 6/2016 | Kim | H04W 72/1284 370/329 |
| 2017/0111886 A1* | 4/2017 | Kim | H04W 72/042 |

* cited by examiner

METHOD AND APPARATUS FOR SCHEDULING BEAM IN MOBILE COMMUNICATION SYSTEM OF ULTRAHIGH FREQUENCY WAVE BAND

CROSS-REFERENCE TO RELATED APPLICATION

This application claims priority to and the benefit of Korean Patent Application No. 10-2014-0181850 filed in the Korean Intellectual Property Office on Dec. 16, 2014, the entire contents of which are incorporated herein by reference.

BACKGROUND OF THE INVENTION (a) Field of the Invention

The present invention relates to beam scheduling. More particularly, the present invention relates to a method and apparatus for scheduling a beam in a mobile communication system of an ultrahigh frequency wave band.

(b) Description of the Related Art

An existing cellular mobile communication system uses a transmitting method based on orthogonal frequency division multiplexing (OFDMA) access-based frequency domain scheduling for obtaining complex multi-input multi-output (MIMO) multiplexing and a multiple user frequency diversity gain while using a cellular frequency band of 6 GHz or less.

Such a cellular mobile communication system requires a frequency efficiency increase of about 1000 times greater than that of an existing case due to rapid increase of data traffic. As a method of enabling a frequency efficiency increase, technology that secures and services an ultra-wideband in an ultrahigh frequency wave has been researched. For example, research that applies an ultrahigh frequency wave of 10 GHz or more to cellular mobile communication has started, and an ultrahigh frequency wave of 10 GHz or more has a characteristic of strong rectilinearity.

Therefore, a complex MIMO multiplexing and frequency domain scheduling transmitting method based on rich scattering of a cellular frequency band may be inappropriate to mobile communication using an ultrahigh frequency wave of 10 GHz or more.

SUMMARY OF THE INVENTION

The present invention has been made in an effort to provide a method and apparatus for performing scheduling using rectilinearity of a beam in a mobile communication system of an ultrahigh frequency wave band.

An exemplary embodiment of the present invention provides a method of scheduling a beam in a mobile communication system, including: receiving, by a terminal, signals through a plurality of switching beam directions; selecting a signal having largest intensity among the received signals; and transmitting an uplink scheduling request signal in a beam direction corresponding to the selected signal.

The receiving of signals includes receiving a plurality of beams that are transmitted while performing beam switching in a transmission time interval (TTI) unit by a base station.

The transmitting of an uplink scheduling request signal may include including and transmitting a cell identifier and/or a beam identifier of a base station to send an uplink signal in one field of the uplink scheduling request signal.

The transmitting of an uplink scheduling request signal may include transmitting an uplink scrambling signal that is mapped to a cell identifier and/or a beam identifier of a base station to send an uplink signal.

The uplink scheduling request signal may be a scheduling request (SR) or a sounding pilot.

The method may further include: receiving, by the base station, the uplink scheduling signal; and extracting a beam identifier and/or a cell identifier from the uplink scheduling signal and allocating a beam corresponding to the extracted beam identifier and/or cell identifier to the terminal.

The receiving of signals may include receiving, by the terminal, signals that are received through a plurality of switching beam directions by simultaneously performing beam tracking in a predetermined fixed plurality of switching beam directions.

The receiving of signals may include receiving, by the terminal, signals that are received through a plurality of switching beam directions by sequentially performing beam tracking in a predetermined fixed plurality of switching beam directions.

Another embodiment of the present invention provides a beam scheduling apparatus of a terminal in a mobile communication system, including: an antenna unit including a plurality of antennas that receive signals through a plurality of switching beam directions; a beam tracking unit that performs beam tracking in the plurality of switching beam directions and that selects a signal having largest intensity among signals that are received from each direction; and a scheduling request unit that transmits an uplink scheduling request signal in a beam direction corresponding to the selected signal, wherein the antenna unit receives a plurality of beams that are transmitted while performing beam switching in a transmission time interval (TTI) unit by a base station.

The beam scheduling apparatus may further include a beam selection unit that selects a signal that is received through one antenna among the plurality of antennas and that provides the signal to the beam tracking unit.

The beam tracking unit may simultaneously perform beam tracking or sequentially perform beam tracking in a fixed plurality of switching beam directions that are preset by the terminal.

The scheduling request unit may include and transmit a cell identifier and/or a beam identifier of a base station to send an uplink signal cell in one field of an uplink scheduling request signal.

The scheduling request unit may transmit an uplink scrambling signal that is mapped to a cell identifier and/or a beam identifier of a base station to send an uplink signal.

Yet another embodiment of the present invention provides a beam scheduling apparatus of a terminal in a mobile communication system, including: an antenna unit including antennas transmitting a plurality of beams according to a plurality of beam patterns; a signal processor that performs modulation and demodulation processing of a signal that is transmitted/received through the antenna unit and that detects an uplink scheduling request signal that is transmitted from a terminal; and a beam scheduling unit that extracts a beam identifier and/or a cell identifier from the uplink scheduling request signal and that allocates a beam corresponding to the extracted beam identifier and/or cell identifier to the terminal, wherein the antenna unit transmits a plurality of beams to the terminal while performing beam switching in a transmission time interval (TTI) unit.

The antenna unit may be formed with a circular type of antenna array, and the antenna array may be formed in one of a patch array type and a horn type.

The antenna unit may include a patch array antenna that forms a plurality of switching beams on each sector basis and forms a fixed beam corresponding to each sector, when the base station is divided into a plurality of sectors.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in an entire specification, unless explicitly described to the contrary, the word "comprise" and variations such as "comprises" or "comprising" will be understood to imply the inclusion of stated elements but not the exclusion of any other elements.

Hereinafter, a method and apparatus for scheduling a beam in a mobile communication system of an ultrahigh frequency wave band according to an exemplary embodiment of the present invention will be described in detail with reference to the drawings.

Figure 1:
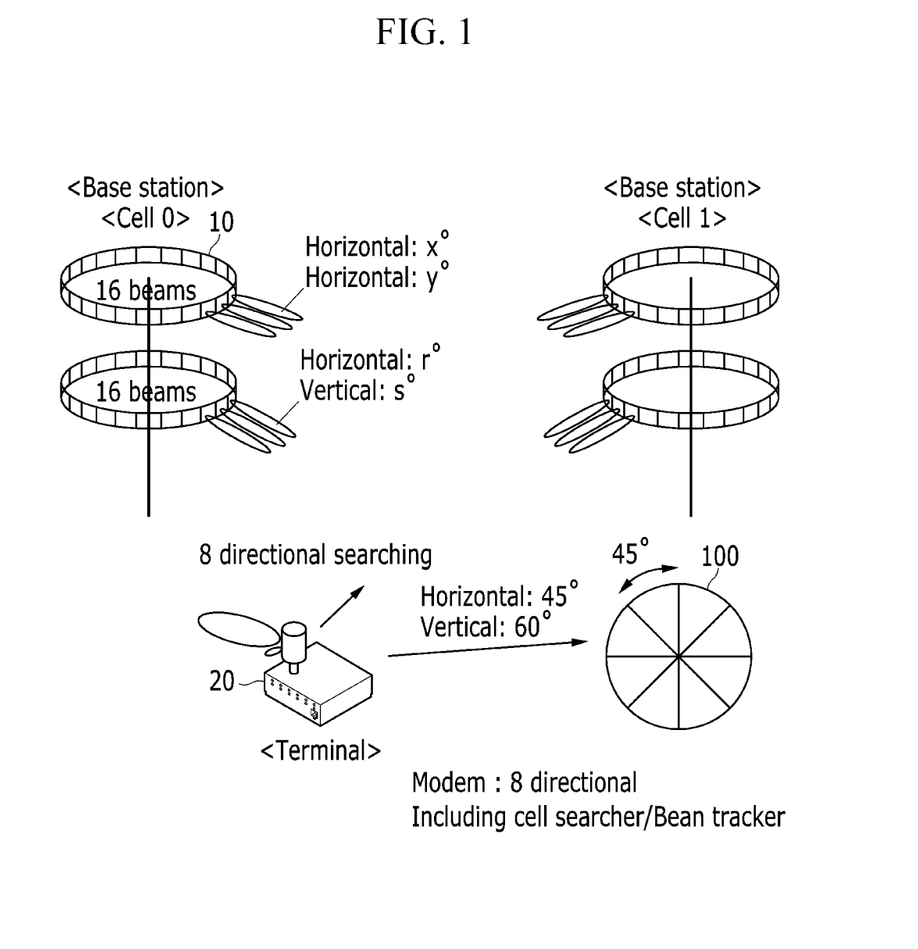
FIG. 1 is a diagram illustrating beam switching of a base station according to an exemplary embodiment of the present invention.

FIG. 1 is a diagram illustrating beam switching of a base station according to an exemplary embodiment of the present invention.

As shown in FIG. 1, a base station 1 according to an exemplary embodiment of the present invention forms a plurality of transmitting/receiving fixed beams using, for example, a circular type of antenna array, and performs communication with a plurality of terminals within a cell. The antenna array may form beams of, for example, 16 patterns, and because each beam may perform communication with different terminals, a capacity of the base station may increase in proportion to the number of fixed beams with which the base station is constructed.

By differently setting a weight to a plurality of antenna elements constituting an antenna array, a directional beam may be provided in a direction of the terminal. By fixing a horizontal angle and a vertical angle of a beam that an antenna element constituting an antenna forms to a predetermined angle, a fixed beam may be generated in a fixed direction. The base station has a predetermined plurality of beam patterns, and the plurality of beam patterns may be defined in a form of a weight vector of antenna elements of the base station. The base station forms and radiates an optimal beam in a direction of the terminal.

A terminal 2 forms switched beams of several angles and performs transmitting/receiving beam switching in an optimal base station direction. As shown in FIG. 1, the terminal 2 may perform beam tracking in a plurality of directions, for example, 8 directions, may perform beam tracking in different directions of 45°, and may receive a beam that is transmitted to the base station according to beam tracking.

By combining an entire beam, the base station 1 using a circular type of antenna array of FIG. 1 forms one cell, and the one cell may form a circular type of antenna array in at least one layer.

Figure 2:
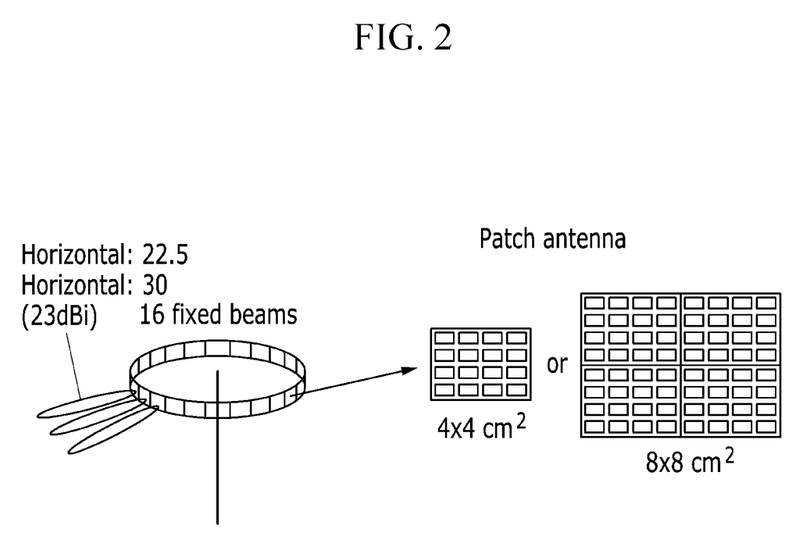
FIG. 2 is a diagram illustrating a structure of an antenna according to an exemplary embodiment of the present invention.

FIG. 2 is a diagram illustrating a structure of an antenna according to an exemplary embodiment of the present invention.

As shown in FIG. 2, an antenna array may be implemented in a patch array type, for example, in a patch array type of 4×4 or 8×8. Further, the antenna array may be implemented in a horn type. An entire shape of an antenna, a disposition of antenna elements constituting each surface of an antenna, the number of antenna elements, and a horizontal angle and a vertical angle of a beam that each antenna element forms may be changed in various forms according to an environment in which the antenna is installed.

An antenna array that is implemented in such a type forms a beam in predetermined directions and transmits/receives the beam, as shown in FIG. 2.

The antenna array of the terminal may be implemented in a patch array type or a horn type.

Figure 3:
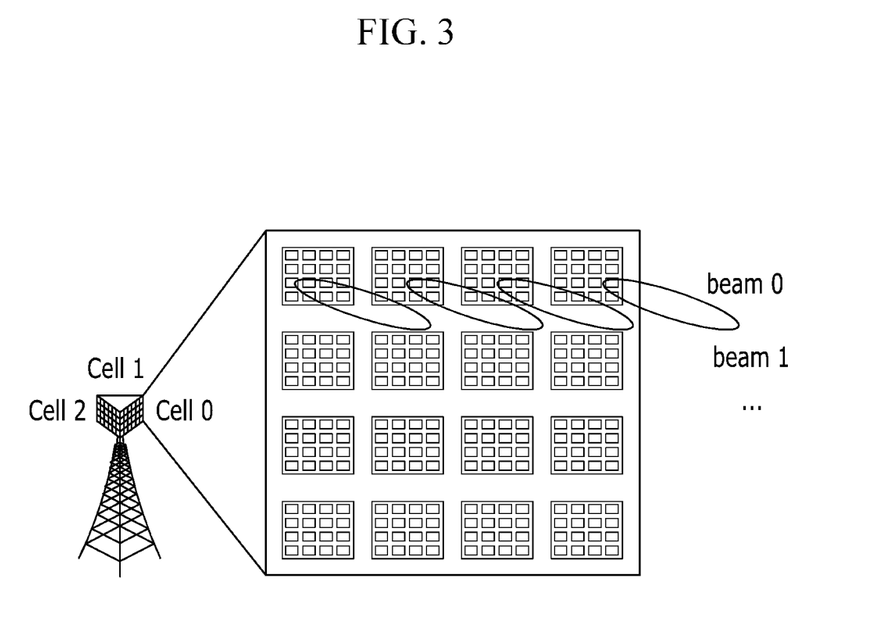
FIG. 3 is another diagram illustrating a structure of an antenna according to an exemplary embodiment of the present invention.

FIG. 3 is another diagram illustrating a structure of an antenna according to an exemplary embodiment of the present invention.

As shown in FIG. 3, when one base station is divided into three sectors, the one base station may include a patch array antenna for forming a plurality of switching beams on each sector basis. For example, as shown in FIG. 3, the patch array antenna is a patch array antenna that is formed with a plurality of antenna elements corresponding to each sector, and each patch array antenna forms a fixed beam.

Hereinafter, a method of scheduling a beam according to an exemplary embodiment of the present invention will be described.

As shown in FIG. 1, the base station forms a switched beam, and in order to maximally use rectilinearity of a millimeter wave, each beam has directivity. For this purpose, the base station uses a circular type (or a patch array antenna corresponding to a sector of FIG. 3) that is formed with a plurality of antenna elements, and differently sets a weight vector to each antenna element to define a plurality of beam patterns.

The base station may form one cell by combining an entire beam, and each beam belonging to one cell may be switched in a predetermined unit, for example, in a minimum transmission time interval (TTI) unit. A situation in which the base station should switch a beam of the base station to which the terminal belongs according to a mobility level of the terminal may occur, and as a moving speed of the terminal increases, the base station should quickly perform beam switching, and in this case, the base station may perform beam switching in a TTI unit, which is a maximum speed.

The base station may share an identifier of a weight vector with the terminal and provide a directional beam to the terminal based on an identifier of a weight vector that the terminal selects. The base station may include an identifier of a weight vector in a downlink signal and transmit the downlink signal to the terminal. For convenience of description, an identifier of a weight vector is referred to as a beam identifier. The beam identifier may be processed into encoded symbol data to be included and transmitted in the downlink signal. In addition, the cell identifier may be included in the downlink signal.

The base station transmits a switched beam to the terminal while performing beam switching in a TTI unit, which is a maximum speed.

The terminal, having received a plurality of switched beams that are transmitted from the base station, measures receiving power of each received beam, determines a beam having maximum receiving power, and transmits an uplink signal in a direction corresponding to a beam having maximum receiving power. That is, the terminal transmits an uplink signal in a direction in which reception intensity of a downlink signal is large (in an example of FIG. 1, a direction having large reception intensity among 8 available directions). Specifically, the terminal transmits an uplink scheduling request signal, i.e., a scheduling request (SR) or a sounding pilot in a direction (a direction having large reception intensity) that the terminal receives. Here, a cycle of transmitting an SR or a sounding pilot may be controlled in a superordinate layer (L2/L3) of the terminal.

Such a terminal may be simultaneously connected to a signal from at least one base station, and each signal may be different beams of the same cell area and may be a signal of a different cell area.

The base station receives an SR or a sounding pilot that the terminal transmits. The base station may perform a process of tracking for an SR or a sounding pilot on each beam direction basis. When an SR or a sounding pilot that the terminal transmits is detected, the base station transmits and receives a traffic channel to and from the terminal through a beam of a corresponding direction.

In order to transmit/receive a traffic channel to and from the base station, when transmitting an SR or a sounding pilot, the terminal may include and transmit a cell identifier (e.g., cell ID) and/or a beam identifier (e.g., beam ID) of the base station in the SR or the sounding pilot. The cell identifier and the beam identifier are acquired from a downlink signal that is received from the base station.

The terminal may explicitly or implicitly include and transmit such identifier information (cell ID, beam ID) in the uplink scheduling request signal.

With a method of explicitly including and transmitting identifier information, for example, the terminal loads cell identifier (cell ID) and/or beam identifier (beam ID) information of a base station to send an uplink signal in one field of an uplink scheduling request signal and encodes and transmits a channel.

Further, with a method of implicitly including and transmitting identifier information, for example, the terminal selects and transmits an uplink scrambling signal that is mapped to a cell identifier (cell ID) and/or a beam identifier (beam ID) of a base station to send an uplink signal.

The terminal may transmit a random access preamble in addition to a scheduling request signal, i.e., an SR or a sounding pilot.

Figure 4:
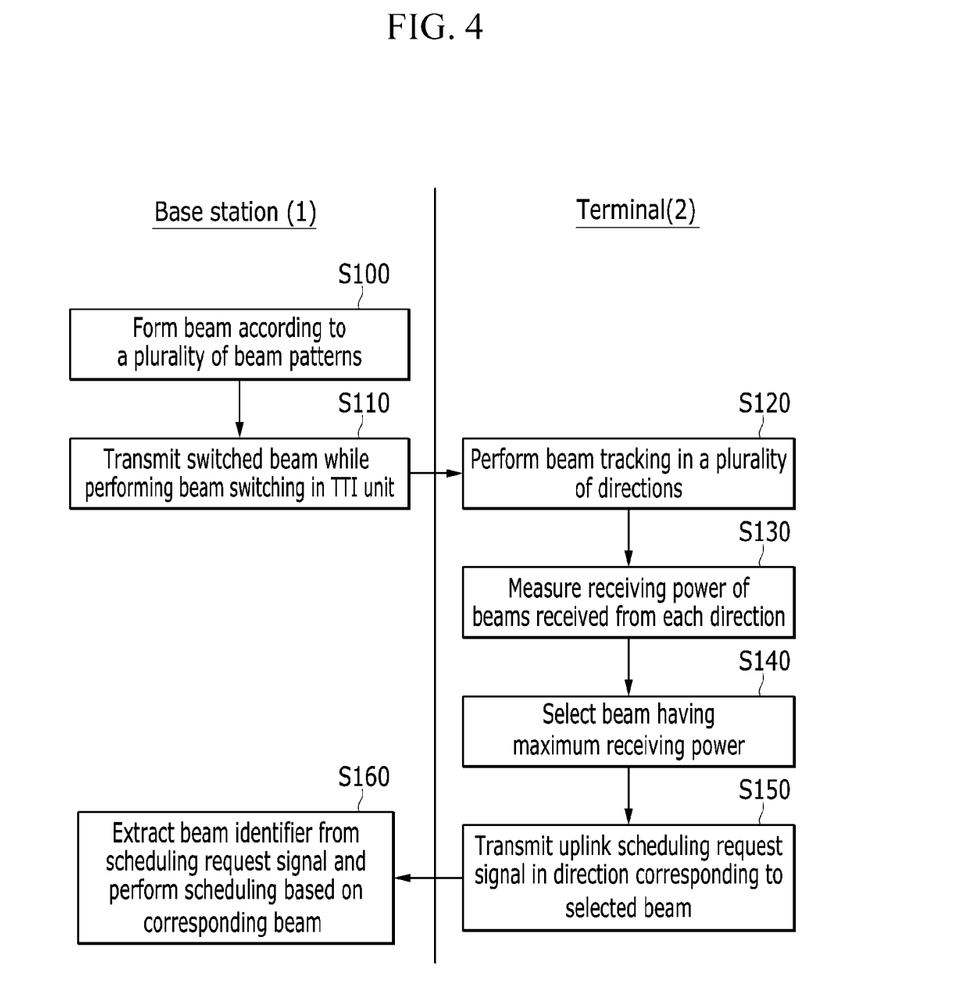
FIG. 4 is a message flow diagram illustrating a method of scheduling a beam according to an exemplary embodiment of the present invention.
Figure 5:
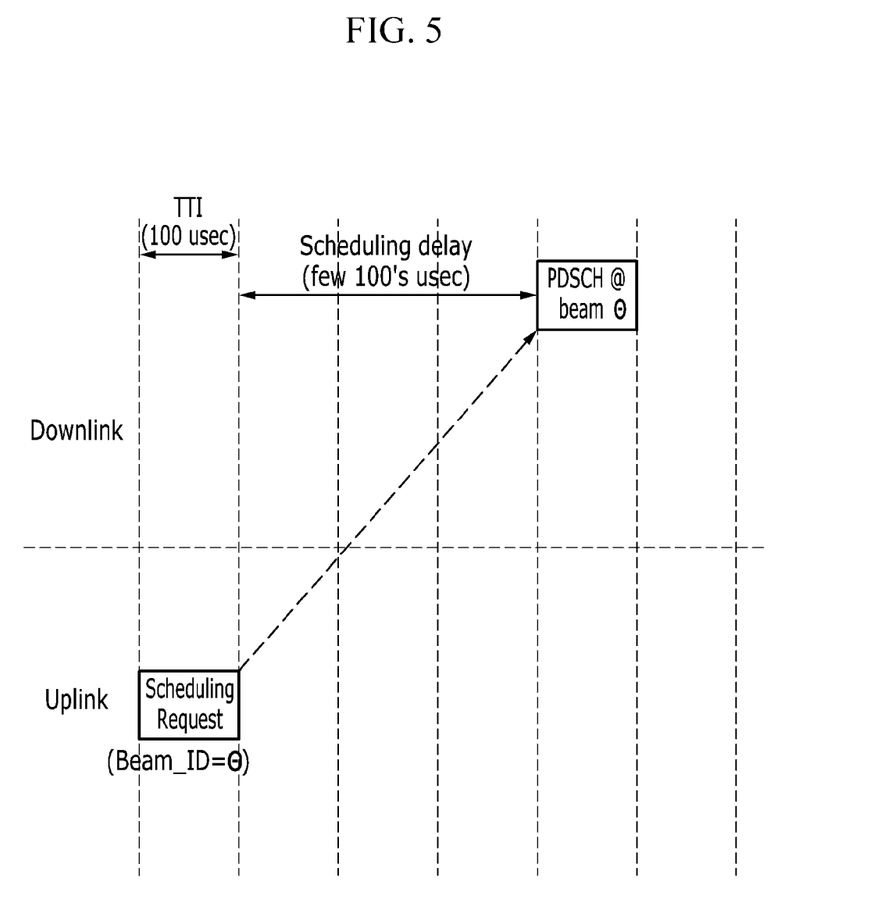
FIG. 5 is a diagram illustrating a signal transmitting/receiving state according to beam scheduling.

FIG. 4 is a message flow diagram illustrating a method of scheduling a beam according to an exemplary embodiment of the present invention, and FIG. 5 is a diagram illustrating a signal transmitting/receiving state according to beam scheduling.

As shown in FIG. 4, the base station 1 forms and transmits a plurality of fixed beams according to a plurality of beam patterns (S100), and as shown in FIG. 5, the base station 1 transmits a switched beam to the terminal while performing beam switching in a predetermined speed, i.e., a TTI unit (S110). The base station 1 includes and transmits a beam identifier and/or a cell identifier in a switched beam, i.e., a downlink signal.

The terminal 2 tracks beams that are transmitted to the base station 1 (S120) and measures receiving power of beams that are received from each direction while performing beam tracking in a predetermined direction, i.e., 8 directions (S130). Because performance sensitively changes according to a beam forming in each of the base station and the terminal, in mobile communication of an ultrahigh frequency wave band, a tracking process of beams having a channel in which communication is available is performed. The terminal 2 performs tracking of downlink signals that are received in a fixed beam direction. For example, as shown in FIG. 1, the terminal 2 performs tracking of downlink signals from the base station that are received in 8 fixed directions, and continuously performs tracking of available beams of an entire available base station of a periphery of the terminal in a fixed receiving direction.

The terminal 2 compares receiving power of beams that are received from each direction and selects a beam having maximum receiving power (S140). The terminal 2 transmits an uplink signal in a direction corresponding to a beam having maximum receiving power (S150). That is, as shown in FIG. 5, the terminal 2 transmits an uplink signal that requests scheduling in a direction in which reception intensity of a downlink signal is large. Here, the uplink scheduling request signal may be one of an SR or a sounding pilot and a random access preamble. In this case, the terminal 2 may load and transmit cell identifier and/or beam identifier (beam ID) information of a base station to send an uplink signal to one field of an uplink scheduling request signal, or may select and transmit an uplink scrambling signal that is mapped to a cell identifier (cell ID) and/or a beam identifier (beam ID) of the base station as an uplink scheduling request signal.

The base station 1 receives an uplink scheduling request signal that is transmitted from the terminal 2 and extracts a beam identifier and/or a cell identifier from the received uplink scheduling request signal. The base station 1 allocates a beam corresponding to the extracted beam identifier and/or cell identifier to the terminal 2 and performs scheduling of the corresponding beam (S160). Thereafter, the terminal 2 may receive an appropriate beam from the base station 1, and perform traffic transmission/reception between the base station 1 and the terminal 2 through the corresponding beam.

Figure 6:
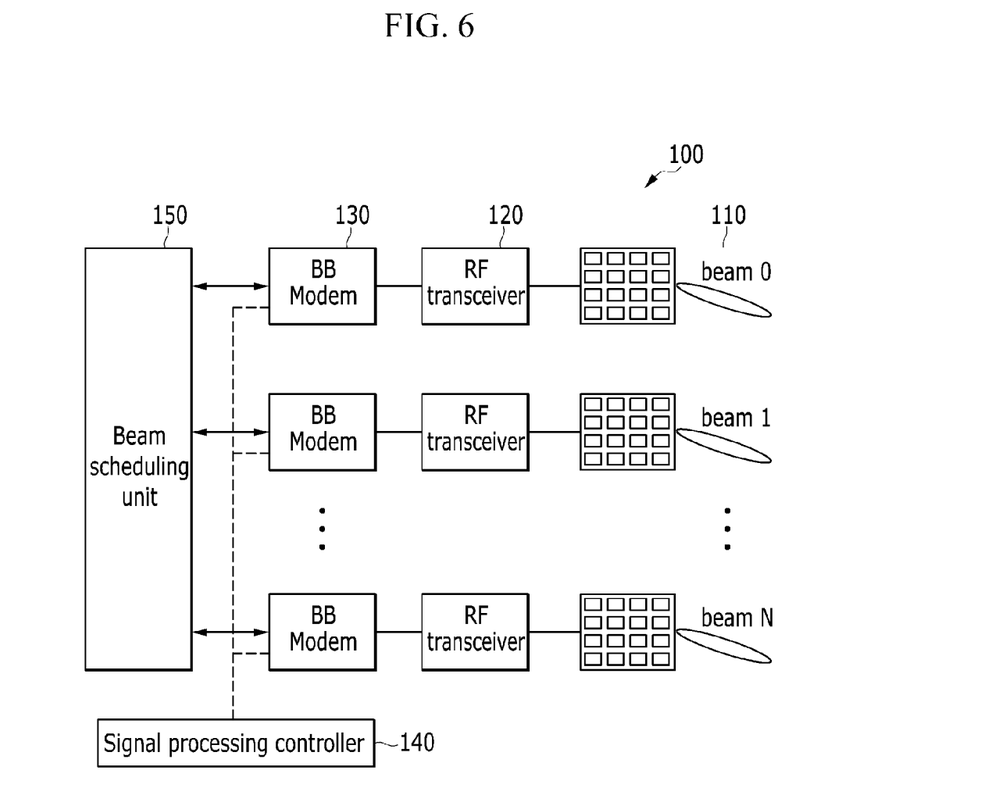
FIG. 6 is a diagram illustrating a structure of a beam scheduling apparatus of a base station according to an exemplary embodiment of the present invention.

FIG. 6 is a diagram illustrating a structure of a beam scheduling apparatus of a base station according to an exemplary embodiment of the present invention.

As shown in FIG. 6, a beam scheduling apparatus 100 includes an antenna unit 110, an RF transceiver 120, a signal processor 130, a signal processing controller 140, and a beam scheduling unit 150.

The antenna unit 110 generates a plurality of beams having directivity, and transmits/receives a signal based on an applied control signal.

The RF transceiver 120 performs an RF processing of a signal that is transmitted or received through an antenna. The RF transceiver 120 is formed with the same number as that of antennas to connect one antenna and one RF transceiver. When an antenna, i.e., a beam to generate is the n number, the RF transceiver may be formed with the n number.

The signal processor 130 is connected to the RF transceiver 120 to perform signal processing including signal modulation and demodulation processing. The signal processor 130 may be referred to as a modem, and in order to process a signal corresponding to each beam, the signal processor 130 may be formed to connect one signal processor to one RF transceiver. The signal processor 130 detects an uplink scheduling request signal (SR or sounding pilot) that is transmitted from, particularly, the terminal, and provides the uplink scheduling request signal to the beam scheduling unit 150. For this purpose, the signal processor 130 may be implemented in a form including an SR or a sounding pilot detector.

Such a signal processor 130 may perform a tracking function of a random access signal that the terminal transmits for uplink synchronization as well as a modem function for transmitting/receiving a traffic data channel.

The signal processing controller 140 performs control of signal processing through the signal processor 130.

The beam scheduling unit 150 enables a plurality of beams to transmit through the antenna unit 110 and performs beam switching at a predetermined speed, for example, in a TTI unit, to enable a switched beam to be transmitted.

Further, the beam scheduling unit 150 receives an uplink scheduling request signal that is transmitted from a terminal through the signal processing controller 140, and extracts a beam identifier and/or a cell identifier from the received uplink scheduling request signal. The beam scheduling unit 150 allocates a beam corresponding to the extracted beam identifier and/or cell identifier to the terminal. In order to transmit/receive a traffic channel to and from the terminal through a beam that is allocated to the terminal, the beam scheduling unit 150 may control each signal processor 130 through the signal processing controller 140.

Figure 7:
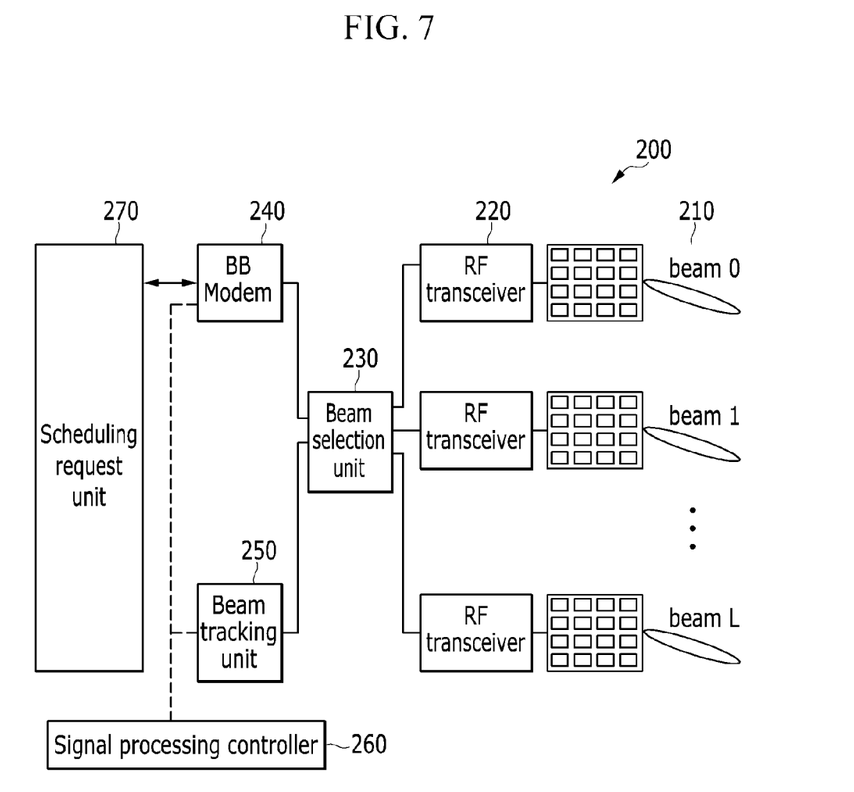
FIG. 7 is a diagram illustrating a structure of a beam scheduling apparatus of a terminal according to an exemplary embodiment of the present invention.

FIG. 7 is a diagram illustrating a structure of a beam scheduling apparatus of a terminal according to an exemplary embodiment of the present invention.

As shown in FIG. 7, a beam scheduling apparatus 200 includes an antenna unit 210, an RF transceiver 220, a beam selection unit 230, a signal processor 240, a beam tracking unit 250, a signal processing controller 260, and a scheduling request unit 270.

The antenna unit 210 generates a plurality of beams having directivity, and transmits/receives a signal based on an applied control signal.

The RF transceiver 220 performs RF processing of a signal that is transmitted or received through an antenna. The RF transceiver 220 is formed with the same number as that of antennas to connect an antenna and an RF transceiver. When the number of antennas, i.e., beams to generate, is n, the RF transceiver may be formed with the n number. For example, 8 RF transceivers may be formed to correspond to beams of 8 directions.

The beam selection unit 230 selects a beam to transmit/receive one beam in available beam directions of the terminal. For this purpose, the beam selection unit 230 selects one of a plurality of RF transceivers 220 to transmit/receive a signal.

The signal processor 240 is connected to the RF transceiver 220 to perform signal processing including signal modulation and demodulation processing. The signal processor 240 may be referred to as a modem. The signal processor 240 may be formed in a structure that can process a signal that is transmitted/received in one direction or a small number of directions (larger than 1 or the same as 1 and smaller than L) among available beam directions of, for example, the L number (8 in an example of FIG. 1) of terminals.

The signal processing controller 260 performs the control of signal processing through the signal processor 240.

The beam tracking unit 250 performs tracking of each signal that is received in fixed beam directions (e.g., 8 directions of FIG. 1) of a terminal. The beam tracking unit 250 may continuously perform tracking of available beams of an entire available base station of a periphery of the terminal, and may simultaneously track all switching beam directions of the terminal or sequentially track all switching beam directions.

The beam tracking unit 250 may acquire frequency and symbol synchronization information of peripheral base stations, frame synchronization information, and physical layer identification information.

The beam tracking unit 250 selects a signal having excellent signal quality, for example, a largest intensity based on intensity of signals that are received according to switching direction tracking.

In order to form a link with an antenna of a direction corresponding to a signal that is selected by the beam tracking unit 250, the signal processing controller 260 may send a control signal to a corresponding RF transceiver 220.

The scheduling request unit 270 acquires identification information, for example, a beam identifier and/or a cell identifier from a signal that is selected by the beam selection unit 230, and performs processing for forming a wireless link with a corresponding base station based on the identification information.

The scheduling request unit 270 transmits an uplink signal that requests scheduling in a direction in which reception intensity that is selected by the beam selection unit 230 is large. In this case, the scheduling request unit 270 may load or transmit cell identifier and/or beam identifier (beam ID) information of a base station to send an uplink signal in one field of an uplink scheduling request signal, or may select and transmit an uplink scrambling signal that is mapped to a cell identifier (cell ID) and/or a beam identifier (beam ID) of the base station as an uplink scheduling request signal.

According to an exemplary embodiment of the present invention, in mobile communication of an ultrahigh frequency wave band, fast beam switching of a TTI unit can be performed. Accordingly, cell capacity reduction according to mobility of a terminal can be minimized.

The foregoing exemplary embodiment of the present invention may not only be embodied through an apparatus (object) and/or method, but may also be embodied through a program that can execute a function corresponding to a configuration of a method according to the exemplary embodiment of the present invention or through a computer readable recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of scheduling a beam in a mobile communication system, the method comprising:
   receiving, by a terminal, signals through a plurality of switching beam directions;
   selecting, by the terminal, a signal having largest intensity among the received signals; and
   transmitting, by the terminal, an uplink scheduling request signal in a beam direction corresponding to the selected signal, wherein the uplink scheduling request signal comprises a cell identifier and/or a beam identifier of a base station to send an uplink signal,
   wherein the receiving of signals comprises receiving a plurality of beams that are transmitted while performing beam switching in a transmission time interval (TTI) unit by a base station, and
   wherein the cell identifier and/or the beam identifier of the base station is provided to the terminal by a downlink signal from the base station.

2. The method of claim 1, wherein the transmitting of an uplink scheduling request signal comprises including and transmitting the cell identifier and/or the beam identifier of the base station to send an uplink signal in one field of the uplink scheduling request signal.

3. The method of claim 2, wherein the uplink scheduling request signal is a scheduling request (SR) or a sounding pilot.

4. The method of claim 2, further comprising:
   receiving, by the base station, the uplink scheduling signal; and
   extracting a beam identifier and/or a cell identifier from the uplink scheduling signal and allocating a beam corresponding to the extracted beam identifier and/or cell identifier to the terminal.

5. The method of claim 1, wherein the transmitting of an uplink scheduling request signal comprises transmitting an uplink scrambling signal that is mapped to the cell identifier and/or the beam identifier of the base station to send an uplink signal, as the uplink scheduling request signal.

6. The method of claim 1, wherein the receiving of signals comprises receiving, by the terminal, signals that are received through a plurality of switching beam directions by simultaneously performing beam tracking in a predetermined fixed plurality of switching beam directions.

7. The method of claim 1, wherein the receiving of signals comprises receiving, by the terminal, signals that are received through a plurality of switching beam directions by sequentially performing beam tracking in a predetermined fixed plurality of switching beam directions.

8. A beam scheduling apparatus of a terminal in a mobile communication system, the beam scheduling apparatus comprising:
   an antenna array comprising a plurality of antennas that receive signals through a plurality of switching beam directions;
   transceivers respectively connected to each of the plurality of antennas and that perform radio frequency (RF) processing of a signal received through a corresponding antenna;
   one or more processors that process computer executable program code embodied in non-transitory computer readable storage media, the computer executable program code comprising:
      beam tracking program code that performs beam tracking in the plurality of switching beam directions and selects a signal having largest intensity among signals that are received from each direction and are received from each of the transceivers; and
      scheduling request program code that generates an uplink scheduling request signal comprising a cell identifier and/or a beam identifier of a base station to send an uplink signal,
   wherein the uplink scheduling request signal is transmitted through a transceiver and an antenna corresponding to a beam direction of the selected signal,
   wherein the plurality of antennas of the antenna array receives a plurality of beams that are transmitted while performing beam switching in a transmission time interval (TTI) unit by a base station.

9. The beam scheduling apparatus of claim 8, further comprising a beam selection program code that connects the transceivers and that selects a signal that is received through one antenna among the plurality of antennas and that provides the signal to the beam tracking unit.

10. The beam scheduling apparatus of claim 8, wherein the beam tracking program code simultaneously performs beam tracking or sequentially performs beam tracking in a fixed plurality of switching beam directions that are preset by the terminal.

11. The beam scheduling apparatus of claim 8, wherein the cell identifier and/or the beam identifier of the base station to send an uplink signal cell included in one field the uplink scheduling request signal and then the uplink scheduling request signal is transmitted.

12. The beam scheduling apparatus of claim 8, wherein an uplink scrambling signal that is mapped to a cell identifier and/or a beam identifier of a base station to send an uplink signal is transmitted as the uplink scheduling request signal.

13. A beam scheduling apparatus of a base station in a mobile communication system, the beam scheduling apparatus comprising:
   an antenna array comprising antennas that transmits a plurality of beams according to a plurality of beam patterns and receives signals transmitted from a terminal; and
   a signal processor is configured to modulate and demodulate a signal that is transmitted/received through each antenna and detect an uplink scheduling request signal from the modulated signals, wherein the uplink scheduling request signal comprises a cell identifier and/or a beam identifier of the base station,
   wherein a beam corresponding to the cell identifier and/or the beam identifier of the uplink scheduling request signal is allocated to the terminal,
   wherein each antenna of the antenna array transmits a plurality of beams to the terminal while performing beam switching in a transmission time interval (TTI) unit.

14. The beam scheduling apparatus of claim 13, wherein the antenna array is formed as a circular antenna array, and the circular antenna array is formed in one of a patch array type and a horn type.

15. The beam scheduling apparatus of claim 13, wherein the antenna array comprises a patch array antenna that forms a plurality of switching beams on each sector basis and forms a fixed beam corresponding to each sector, when the base station is divided into a plurality of sectors.

* * * * *